(12) United States Patent
Tristram

(10) Patent No.: US 10,239,549 B1
(45) Date of Patent: Mar. 26, 2019

(54) TOOL HOLDING DEVICE FOR A WHEELBARROW

(71) Applicant: Tris Tristram, Newton, NJ (US)

(72) Inventor: Tris Tristram, Newton, NJ (US)

( * ) Notice: Subject to any disclaimer, the term of this patent is extended or adjusted under 35 U.S.C. 154(b) by 0 days.

(21) Appl. No.: 15/897,962

(22) Filed: Feb. 15, 2018

(51) Int. Cl.
  B62B 1/18 (2006.01)
  B62B 1/22 (2006.01)
  B62B 5/00 (2006.01)
  B62B 1/26 (2006.01)

(52) U.S. Cl.
  CPC .............. B62B 5/0003 (2013.01); B62B 1/18 (2013.01); *B62B 1/22* (2013.01); *B62B 1/262* (2013.01); *B62B 2202/48* (2013.01); *B62B 2202/50* (2013.01)

(58) Field of Classification Search
  CPC ......... B62B 2202/50; B62B 1/18; B62B 1/22; B62B 1/262; B62B 1/204; B62B 2202/48; B60R 11/00; B60R 11/06
  USPC .................. 224/401, 407, 408, 409, 410, 411
  See application file for complete search history.

(56) References Cited

U.S. PATENT DOCUMENTS

| | | | | |
|---|---|---|---|---|
| 4,856,744 A * | 8/1989 | Frankel | ............... | A47G 23/0225 248/215 |
| D338,306 S | 8/1993 | White et al. | | |
| 5,263,578 A * | 11/1993 | Narvey | ................. | B62B 3/1428 206/232 |
| 5,501,383 A * | 3/1996 | Wilson | ..................... | B42F 17/28 206/425 |
| 5,503,297 A * | 4/1996 | Frankel | ............... | A47G 23/0225 220/737 |
| 5,687,979 A | 11/1997 | Plevka | | |
| 5,957,352 A | 9/1999 | Gaves | | |
| 6,193,265 B1 | 2/2001 | Yemini | | |
| 6,494,427 B1 * | 12/2002 | Smith | .................. | A01D 34/001 224/401 |
| 7,681,768 B2 * | 3/2010 | Gates | ...................... | B60R 11/00 224/401 |
| 2007/0039986 A1 | 2/2007 | Tomasi | | |
| 2010/0127028 A1 | 5/2010 | Lusk | | |
| 2011/0260420 A1 | 10/2011 | Volin | | |
| 2012/0145758 A1 * | 6/2012 | Taylor | ..................... | G09F 21/04 224/411 |
| 2013/0048689 A1 * | 2/2013 | Ling | ........................ | B62B 3/146 224/411 |
| 2015/0001267 A1 * | 1/2015 | Thorsen | .................. | B62B 1/204 224/401 |
| 2015/0284017 A1 | 10/2015 | Nilsen | | |
| 2016/0009305 A1 | 1/2016 | Milo | | |

\* cited by examiner

*Primary Examiner* — Justin Larson
(74) *Attorney, Agent, or Firm* — Thomas J. Germinario

(57) ABSTRACT

A tool holding device for a wheelbarrow comprises an oblong handle channel with a longitudinal trough in which a substantial length of the tool handle is seated within multiple locking collars. Each of the locking collars comprise a u-shaped collar trough subtended by a deformable collar strip. When the tool handle is inserted into the channel trough, the collar strips wrap around the handle and cradle it tightly within the trough. The handle channel is connected through a channel flange to one of the sides or the back of the wheelbarrow tub either integrally or by attachment means in the channel flange.

6 Claims, 4 Drawing Sheets

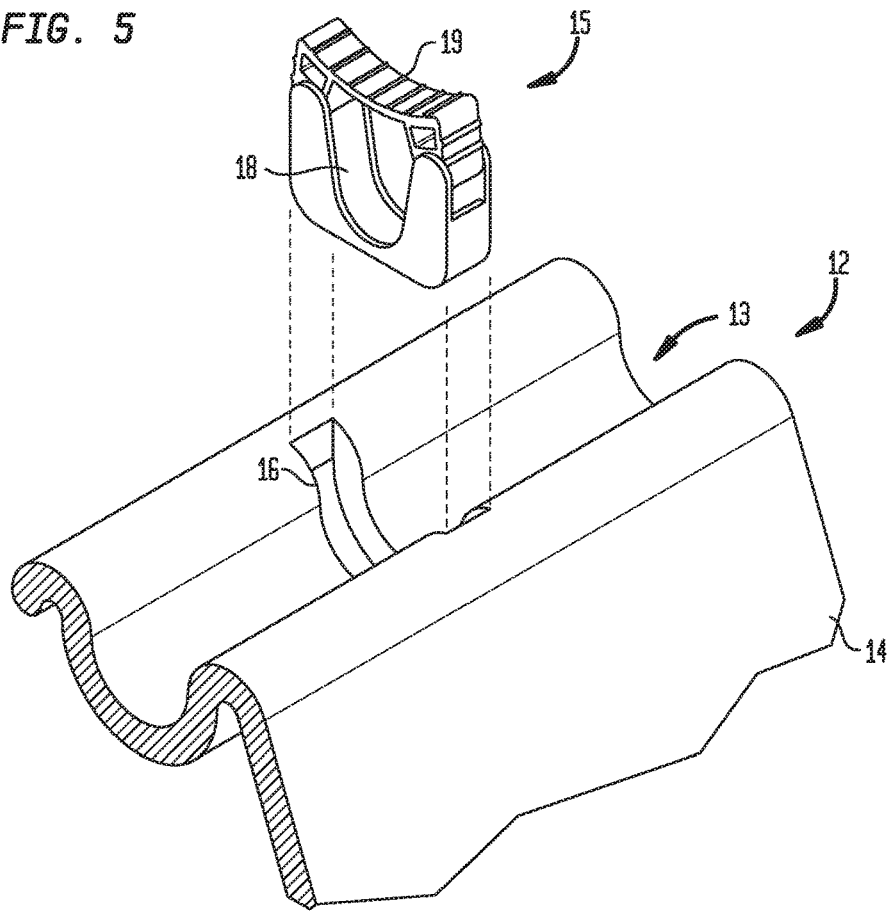
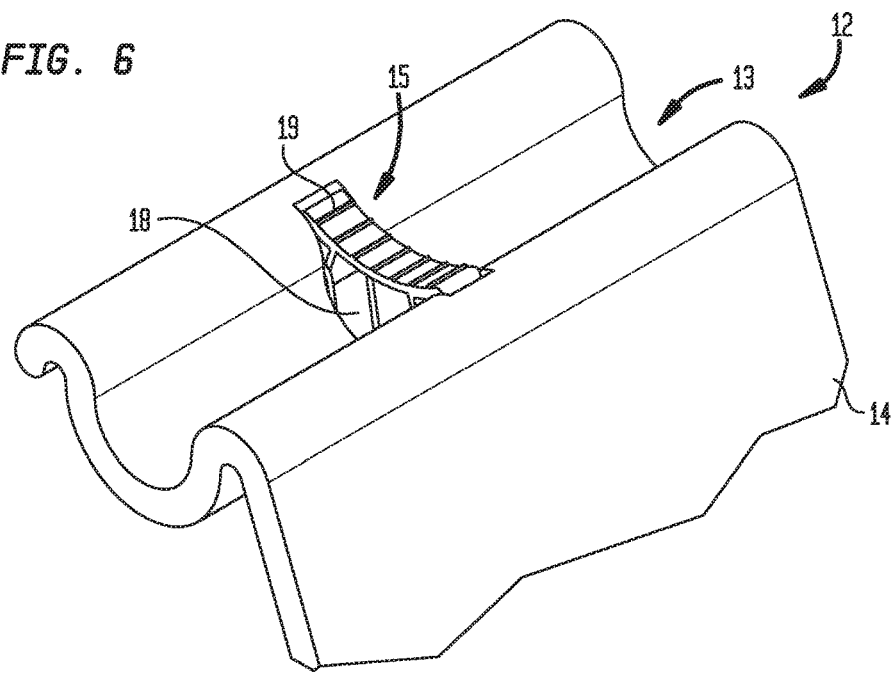

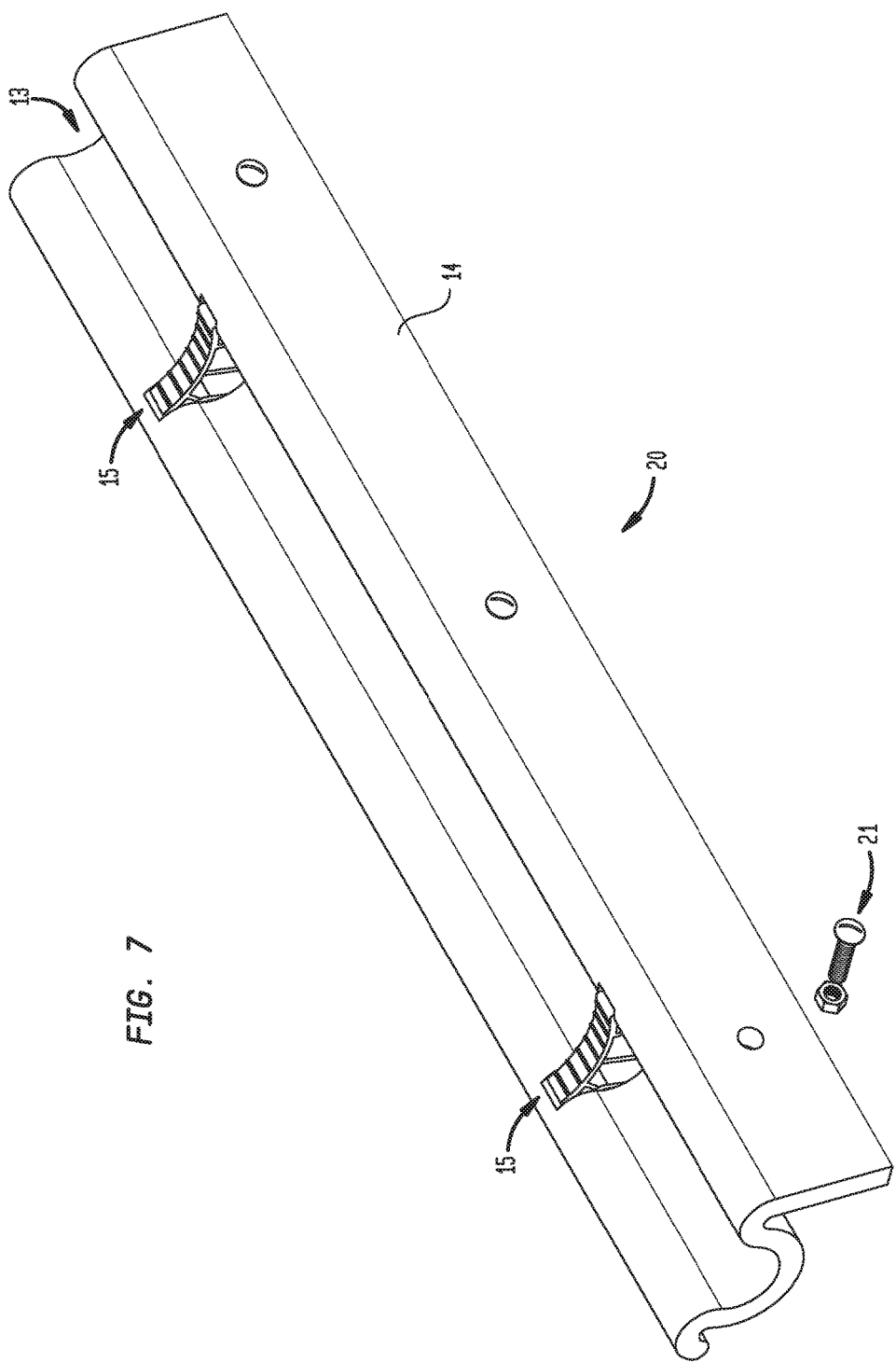

TOOL HOLDING DEVICE FOR A WHEELBARROW

FIELD OF INVENTION

The present invention relates generally to wheelbarrows and more particularly to wheelbarrow attachments and extensions.

BACKGROUND OF THE INVENTION

Wheelbarrows are typically used in conjunction with long-handled tools, such as shovels, rakes and pitch forks. Such tools are often placed in the wheelbarrow as it is pushed along, with the long handles projecting out over the front or side, obstructing the wheelbarrow's passage through doorways or gates. The bouncing of a wheelbarrow on uneven terrain can also cause unsecured tools to fall out onto the ground.

The objective of the present invention is to provide a wheelbarrow extension or attachment designed to secure long-handled tools. While various configurations of tool-holding clips have been proposed in the prior art, these leave most of the length of the tool handle exposed, such that it can become caught on bushes, branches, fencing, etc., as the wheelbarrow is pushed along. On the other hand, the present invention provides a long continuous channel in which the tool handle is lengthwise locked in place.

SUMMARY OF THE INVENTION

The present invention is a device for attaching a handle of a tool to a wheelbarrow. The device comprises an oblong handle channel having a longitudinal, u-shaped channel trough and a channel flange. The handle channel has a length of at least one-third the length of the tool handle, so as to firmly secure the handle and minimize its exposed area. The channel trough has a depth and a width which are at least equal to the diameter of the tool handle.

While the channel trough can be dimensioned so that the handle fits snugly so as to be retained therein, preferably the channel trough contains multiple transverse collar slots, into which deformable locking collars are inserted. Each of the locking collars comprises a u-shaped collar trough, which is substantially congruent with the channel trough, and a deformable collar strip that subtends the collar trough, such that when the tool handle is inserted into the locking collar, the collar strip wraps around the handle so as to cradle it tightly within the collar trough.

In one embodiment of the device, the channel flange transitions into a side or back edge of the wheelbarrow tub, so that the device is an integral extension of the tub. In another embodiment of the device, the device is a discrete attachment to the wheelbarrow tub, such that the channel flange contains multiple attachment means for connecting the channel flange to one of the sides or the back of the wheelbarrow. The attachment means can comprise metal screws or clips.

The foregoing summarizes the general design features of the present invention. In the following sections, specific embodiments of the present invention will be described in some detail. These specific embodiments are intended to demonstrate the feasibility of implementing the present invention in accordance with the general design features discussed above. Therefore, the detailed descriptions of these embodiments are offered for illustrative and exemplary purposes only, and they are not intended to limit the scope either of the foregoing summary description or of the claims which follow.

BRIEF DESCRIPTION OF THE DRAWINGS

FIG. 5 is a partial perspective view of the handle channel with the locking collar insertable into a transverse collar slot in the channel trough, according to one embodiment of the present invention;

FIG. 6 is a partial perspective view of the handle channel with the locking collar inserted into the transverse collar slot in the channel trough, according to one embodiment of the present invention; and FIG. 7 is a perspective view of the handle channel showing exemplary attachment means for connecting the channel flange to a side of the wheelbarrow.

DETAILED DESCRIPTION OF THE PREFERRED EMBODIMENTS

Figure 1:
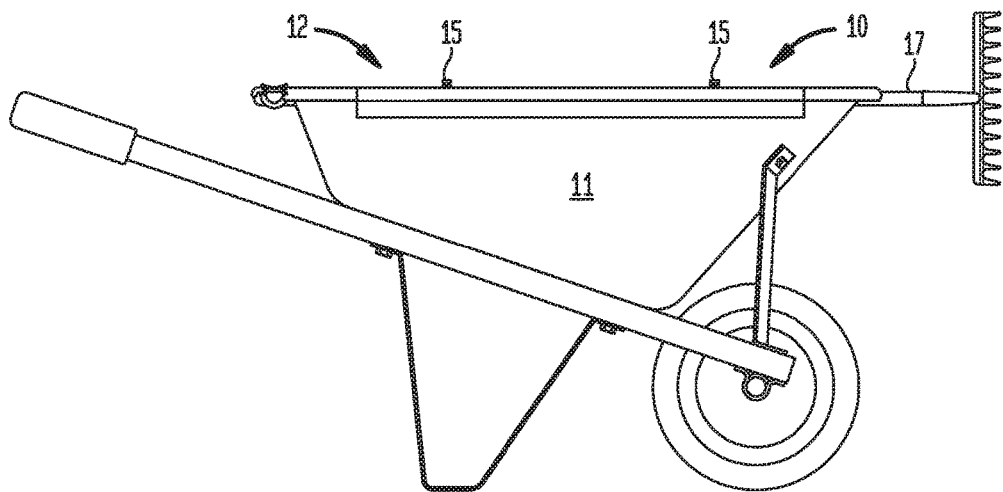
FIG. 1 is a side profile view of a wheelbarrow with one embodiment of the present invention.
Figure 2:
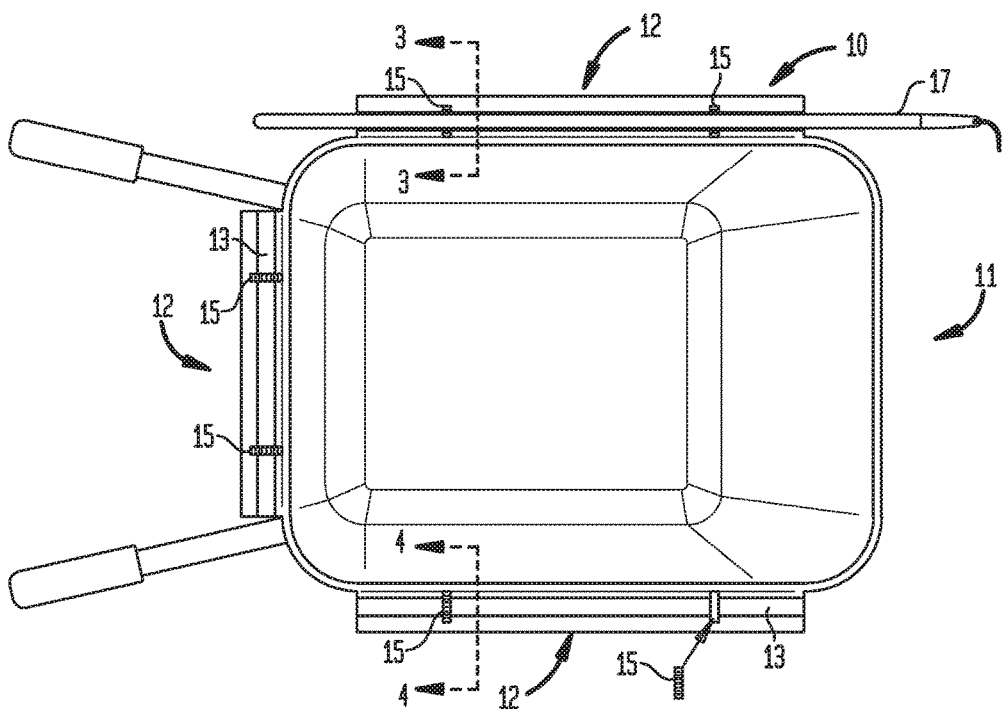
FIG. 2 is a top plan view of a wheelbarrow with one embodiment of the present invention.

Referring to FIGS. 1 and 2, three exemplary embodiments of the present invention 10 are shown extending from the sides and back of a wheelbarrow tub 11. The devices 10 comprises an oblong handle channel 12, which has a longitudinal, u-shaped channel trough 13 and a channel flange 14, (shown in FIGS. 3 and 4) which integrally transitions into the side or back of the wheelbarrow tub 11. Two deformable locking collars 15 have been inserted into transverse collar slots 16 in each of the channel roughs 13. A tool handle 17 is shown inserted into one of the handle channels 12.

Figure 3:
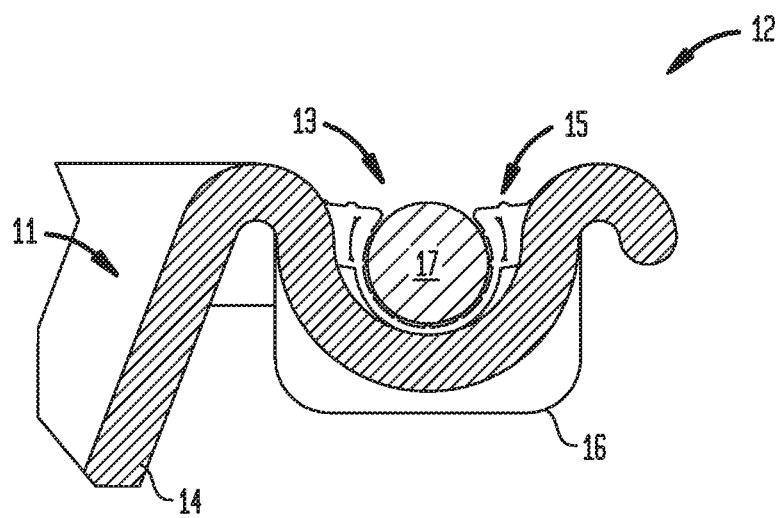
FIG. 3 is a detail cross-sectional view, taken along the line 3-3 in FIG. 2, of a handle channel with a tool handle inserted into a locking collar in a channel trough, according to one embodiment of the present invention.
Figure 4:
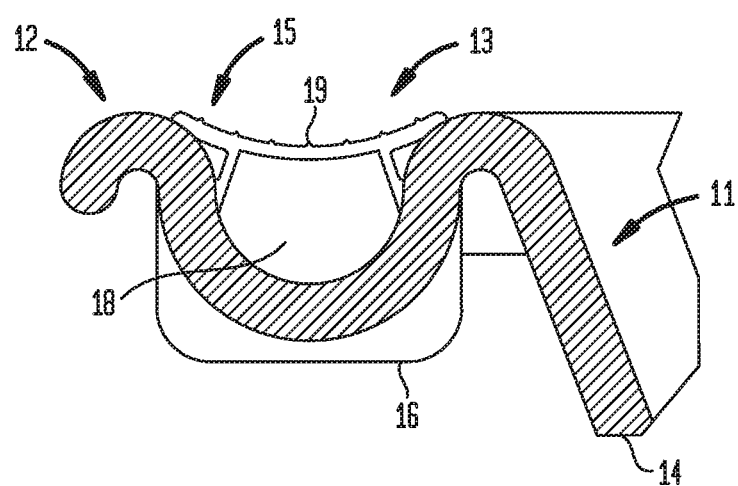
FIG. 4 is a detail cross-sectional view, taken along the line 4-4 in FIG. 2, of the handle channel with the locking collar inserted into the channel trough, according to one embodiment of the present invention.

FIG. 3 depicts a cross-section of the tool handle 17 seated in the channel trough 13 of one of the handle channels 12 and cradled tightly by the deformed locking collar 15. FIG. 4 depicts a cross-section of an undeformed locking collar 15 in the channel trough 13 of one of the other handle channels 12, into which no tool handle 17 has been inserted. In the extension embodiment, as depicted in FIGS. 3 and 4, the channel flange 14 integrally transitions into the side or back edge of the wheelbarrow tub 11 and effectively merges with the rolled edge of the tub 11.

As shown in FIGS. 3-6, the locking collars 15 are inserted into conjugate, transverse collar slots 16 in the channel troughs 13. Each of the locking collars 15 comprises a u-shaped collar trough 18 subtended by a deformable collar strip 19. As best seen in FIG. 3, when a tool handle 17 is inserted into one of the locking collars 15, the collar strip 19 wraps around the handle 17 so as to cradle the handle tightly within the collar trough 13.

As shown in FIGS. 3-6, the channel flange 14 extends from one side of the handle channel 12 and serves to connect it to the wheelbarrow tub 11. In the extension embodiment of the present invention, the channel flange 14 integrally transitions into an edge of wheelbarrow tub 11, as best seen in FIGS. 3 and 4. In the attachment embodiment of the present invention, as depicted in FIG. 7, the channel flange 14 is connected to one of the sides or the back of the wheelbarrow tub 11 by an attachment means 20, which in this example comprises multiple metal screws 21.

Although the preferred embodiments of the present invention have been disclosed for illustrative purposes, those skilled in the art will appreciate that many additions, modifications and substitutions are possible, without departing from the scope and spirit of the present invention as defined by the accompanying claims.

What is claimed is:

1. A wheelbarrow having a device for attaching a handle of a tool to a wheelbarrow tub, comprising:
    an oblong handle channel having a longitudinal, u-shaped channel trough and a channel flange;
    wherein the handle channel has a channel length which is at least one-third of a length the handle of the tool;
    wherein the channel trough has a depth which is at least equal to a diameter of the handle of the tool;
    wherein the channel trough has a width which is at least equal to the diameter of the handle of the tool;
    wherein the channel trough contains one or more transverse collar slots, and wherein each collar slot contains a deformable securing collar, and wherein, when the handle of the tool is inserted into the securing collar, the securing collar deformably wraps around the handle so as to cradle the handle tightly within the collar trough; and
    wherein the channel flange is connected to a side or a back of the wheelbarrow tub.

2. The wheelbarrow according to claim 1, wherein the channel flange integrally transitions into the side or the back of the wheelbarrow tub.

3. The wheelbarrow according to claim 1, wherein the channel flange contains one or more attachment means for connecting the channel flange to the side or the back of the wheelbarrow tub.

4. The wheelbarrow according to claim 1, wherein the securing collar comprises a u-shaped collar trough, which is substantially congruent with the channel trough, and a deformable collar strip that subtends the collar trough, such that when the handle of the tool is inserted into the securing collar, the collar strip wraps around the handle so as to cradle the handle tightly within the collar trough.

5. The wheelbarrow according to claim 2, wherein the securing collar comprises a u-shaped collar trough, which is substantially congruent with the channel trough, and a deformable collar strip that subtends the collar trough, such that when the handle of the tool is inserted into the securing collar, the collar strip wraps around the handle so as to cradle the handle tightly within the collar trough.

6. The wheelbarrow according to claim 3, wherein the securing collar comprises a u-shaped collar trough, which is substantially congruent with the channel trough, and a deformable collar strip that subtends the collar trough, such that when the handle of the tool is inserted into the securing collar, the collar strip wraps around the handle so as to cradle the handle tightly within the collar trough.

* * * * *